(No Model.)
F. VITTE, Sr.
APPARATUS FOR MAKING SHEET GLASS.
No. 600,463. Patented Mar. 8, 1898.
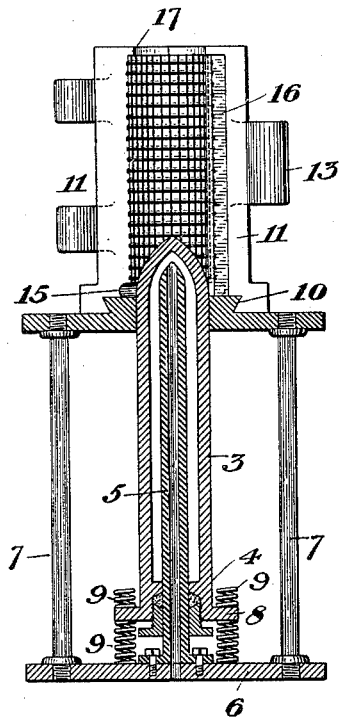
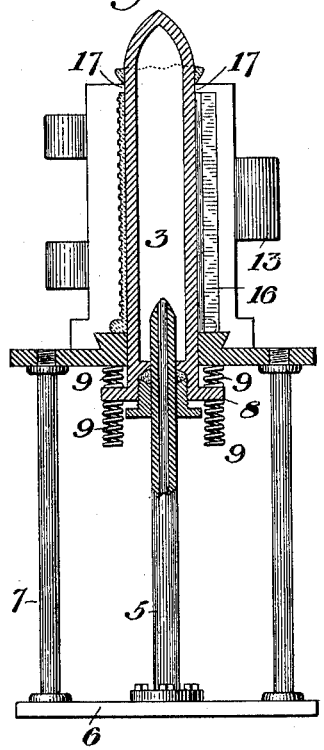
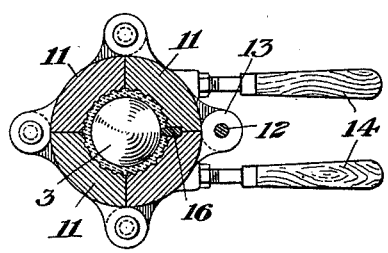
WITNESSES
INVENTOR
Ferdinand Vitte Sr.
by Bakewell & Bakewell
his Attorneys.

United States Patent Office.

FERDINAND VITTE, SR., OF PITTSBURG, PENNSYLVANIA.

APPARATUS FOR MAKING SHEET-GLASS.

SPECIFICATION forming part of Letters Patent No. 600,463, dated March 8, 1898.

Application filed October 7, 1897. Serial No. 654,384. (No model.)

*To all whom it may concern:*

Be it known that I, FERDINAND VITTE, Sr., of Pittsburg, in the county of Allegheny and State of Pennsylvania, have invented a new and useful Improvement in Apparatus for Making Sheet-Glass, of which the following is a full, clear, and exact description, reference being had to the accompanying drawings, forming part of this specification, in which—

Figure 1 is a vertical sectional view of my improved apparatus. Fig. 2 is a similar view showing the plunger in raised position. Fig. 3 is a top plan view, and Fig. 4 is a detail perspective view of the strip for splitting the roller during its formation.

My invention relates to the manufacture of sheet-glass, and especially glass provided with ornamentation upon one side thereof, though it may be used for plain glass; and it consists in means for forming a split cylinder consisting of a suitable mold, a plunger movable through this mold, and means for splitting the glass cylinder its entire length as it is formed in the mold.

It also consists in further constructions and arrangements of the parts, as hereinafter more fully described, and set forth in the claims.

In the drawings, 2 represents the usual mold-supporting table or plate, this plate having a central hole through which reciprocates the hollow plunger 3, having a conical-shaped upper end. The lower end of this plunger is provided with an inner packing-gland 4, surrounding the supply-pipe 5, over which the plunger moves and by which it is guided. The lower end of the pipe 5 is secured to a plate 6, held by depending rods 7, and the plunger 3 is provided with a bottom flange 8, having upwardly and downwardly projecting springs 9, which are arranged to contact with the plates 2 and 6, respectively, in the reciprocation of the plunger, thus cushioning the same at the end of the stroke and preventing injurious shocks. The plate 2 is provided around the central hole with an annular dovetailed projection 10, which enters corresponding recesses in the sections 11 of a four-part mold which is arranged to be clamped around the central hole and held by a pin 12, arranged to pass through registering holes in lugs 13, projecting from two or more of the mold parts or sections, to which the handles 14 are secured. The cavity of this mold is of general circular shape and is provided with any desired pattern cut in its face. At the lower end of the matrix-cavity is an annular recess 15, which is arranged to hold the lower end of the mass of glass which is ladled into the mold and prevent the plunger moving the body of glass upwardly through the mold. 16 is a splitting-strip of the same length as the mold-cavity and arranged to be received in registering recesses in the two parts 11 of the mold which are first opened, this strip being of such a width that it will contact with the side face of the plunger in its upper movement and thus sever or split the glass cylinder or roller being formed. At the upper end of the mold is an inwardly-projecting ring 17, arranged to fit loosely about the plunger as it is moved upwardly therethrough, thus forming a thin or crack-off portion at this point.

The operation of my device is apparent. The parts being in the position of Fig. 1, a suitable quantity of molten glass is ladled out and poured into the mold. The plunger 3 then being moved upwardly by admitting fluid thereinto by pipe 5, it forces the lower portion of the glass into the recess 15 and then moves upwardly through the mass of glass, forcing it out against the sides of the matrix and forming a glass roller having an outer surface ornamented according to the pattern upon the inner face of the mold. The plunger then being withdrawn, the pin 12 is knocked out and the mold parts swung open, the strip 16 dropping out as the mold opens, when the split roller may be removed and flattened or prepared for flattening.

The advantages of my invention will be apparent to those skilled in the art, since a cheap, simple, and effective apparatus is provided by which glass cylinders may be formed easily and cheaply.

The means for splitting the cylinder and the general form and arrangement of the parts will readily be varied by the skilled mechanic without departing from my invention.

I do not claim herein the process of making glass sheets in the manner above described, as the same is described and claimed in my copending application, Serial No. 668,209, filed January 27, 1898, for process of making glass sheets.

I claim—

1. In apparatus for making sheet-glass, a cylinder-mold, a plunger movable therethrough, and means for splitting the glass cylinder its entire length along one side as it is formed in the mold.

2. In apparatus for making sheet-glass, a cylinder-mold, a plunger movable therethrough, and a splitting-strip in the mold-cavity and arranged to split the cylinder its entire length along one side.

3. In apparatus for making sheet-glass, a plate having a hole, a sectional cylinder-mold above the hole, a plunger movable upwardly through the hole and the mold, and a splitting-strip in the mold-cavity arranged to split the cylinder throughout its length.

4. In apparatus for making sheet-glass, a plate having a hole therein, a cylinder-mold arranged to be clamped around the hole and having an annular recess at the lower end of the matrix-cavity, a hollow plunger movable upwardly through said hole and mold, means for admitting fluid-pressure to the plunger, and means for splitting the glass cylinder throughout its length as it is formed.

5. In apparatus for forming split glass cylinders, a sectional mold, a plunger movable therethrough, and a removable splitting-strip fitting in a recess in the mold and arranged to engage one side of the plunger, said strip extending the entire length of the mold-cavity.

In testimony whereof I have hereunto set my hand.

FERDINAND VITTE, SR.

Witnesses:
  LENDELL A. CONNER, Jr.,
  F. E. GAITHER.